United States Patent
Kray et al.

(10) Patent No.: US 9,297,257 B2
(45) Date of Patent: Mar. 29, 2016

(54) SPINNER ASSEMBLY WITH REMOVABLE FAN BLADE LEADING EDGE FAIRINGS

(71) Applicant: General Electric Company, Schenectady, NY (US)

(72) Inventors: Nicholas Joseph Kray, Mason, OH (US); Jorge Orlando Lamboy, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 587 days.

(21) Appl. No.: 13/755,426

(22) Filed: Jan. 31, 2013

(65) Prior Publication Data
US 2014/0212295 A1   Jul. 31, 2014

(51) Int. Cl.
*F01D 5/02* (2006.01)
*F02C 7/04* (2006.01)

(52) U.S. Cl.
CPC ... *F01D 5/02* (2013.01); *F02C 7/04* (2013.01); *F05D 2300/43* (2013.01); *Y02T 50/671* (2013.01)

(58) Field of Classification Search
CPC .............. F01D 5/02; F02C 7/04; F02C 7/042; F02C 7/05; F02C 7/057; B64C 11/02; B64C 11/14; B64D 2033/0286; B64D 2033/0293
See application file for complete search history.

(56) References Cited

U.S. PATENT DOCUMENTS

| | | | |
|---|---|---|---|
| 2,289,400 A | 7/1947 | Woods | |
| 2,498,072 A | 2/1950 | Dean | |
| 5,182,906 A | 2/1993 | Gilchrist et al. | |
| 6,416,280 B1 | 7/2002 | Forrester et al. | |
| 6,561,761 B1 | 5/2003 | Decker et al. | |
| 7,094,033 B2* | 8/2006 | Pauley | F01D 21/045 416/193 A |
| 7,217,096 B2 | 5/2007 | Lee | |
| 7,371,046 B2 | 5/2008 | Lee et al. | |
| 7,374,403 B2 | 5/2008 | Decker et al. | |
| 8,105,037 B2 | 1/2012 | Grover et al. | |
| 8,308,435 B2 | 11/2012 | Storace et al. | |
| 2011/0103726 A1 | 5/2011 | Xie et al. | |

FOREIGN PATENT DOCUMENTS

| | | |
|---|---|---|
| EP | 2458146 A1 | 5/2012 |
| GB | 518873 A | 3/1940 |
| GB | 569167 A | 5/1945 |

OTHER PUBLICATIONS

PCT Search Report & Written Opinion issued in connection with corresponding Application No. PCT/US2014010020 on Jun. 2, 2014.

* cited by examiner

*Primary Examiner* — Craig Kim
*Assistant Examiner* — Maxime Adjagbe
(74) *Attorney, Agent, or Firm* — General Electric Company; William Scott Andes

(57) ABSTRACT

A gas turbine engine spinner assembly including a spinner defining at least in part an aerodynamically smooth surface, a shell defining at least in part the aerodynamically smooth surface, and circumferentially spaced apart removable aerodynamic fairings located around the shell. Fairing shanks disposed in circumferentially spaced apart axially extending slots in the shell may be attached to the aerodynamic fairings. The fairings may shield radially extending portions of the fan blades including portions of blade shanks or portions of transition regions of the blade shanks. The fairing shanks may be disposed between and monolithically formed with the fairings and fairing roots attached to the fairing shanks. The fairings may be made of an injectable thermoplastic and the shell made of metal. The fairing shanks may be setback from fairing forward tips and the fairing shanks may be setback from root forward tips of the fairing roots.

29 Claims, 6 Drawing Sheets

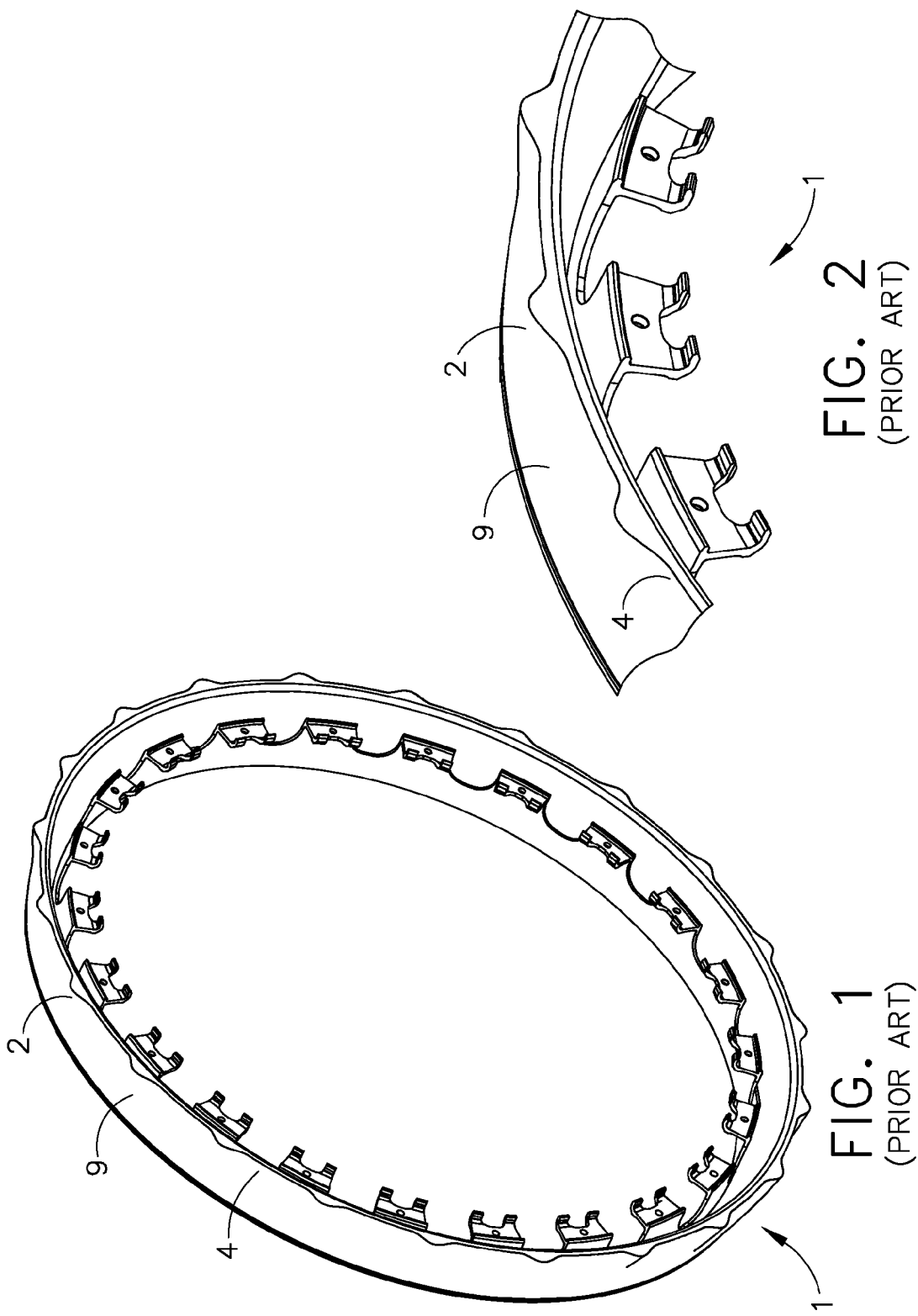

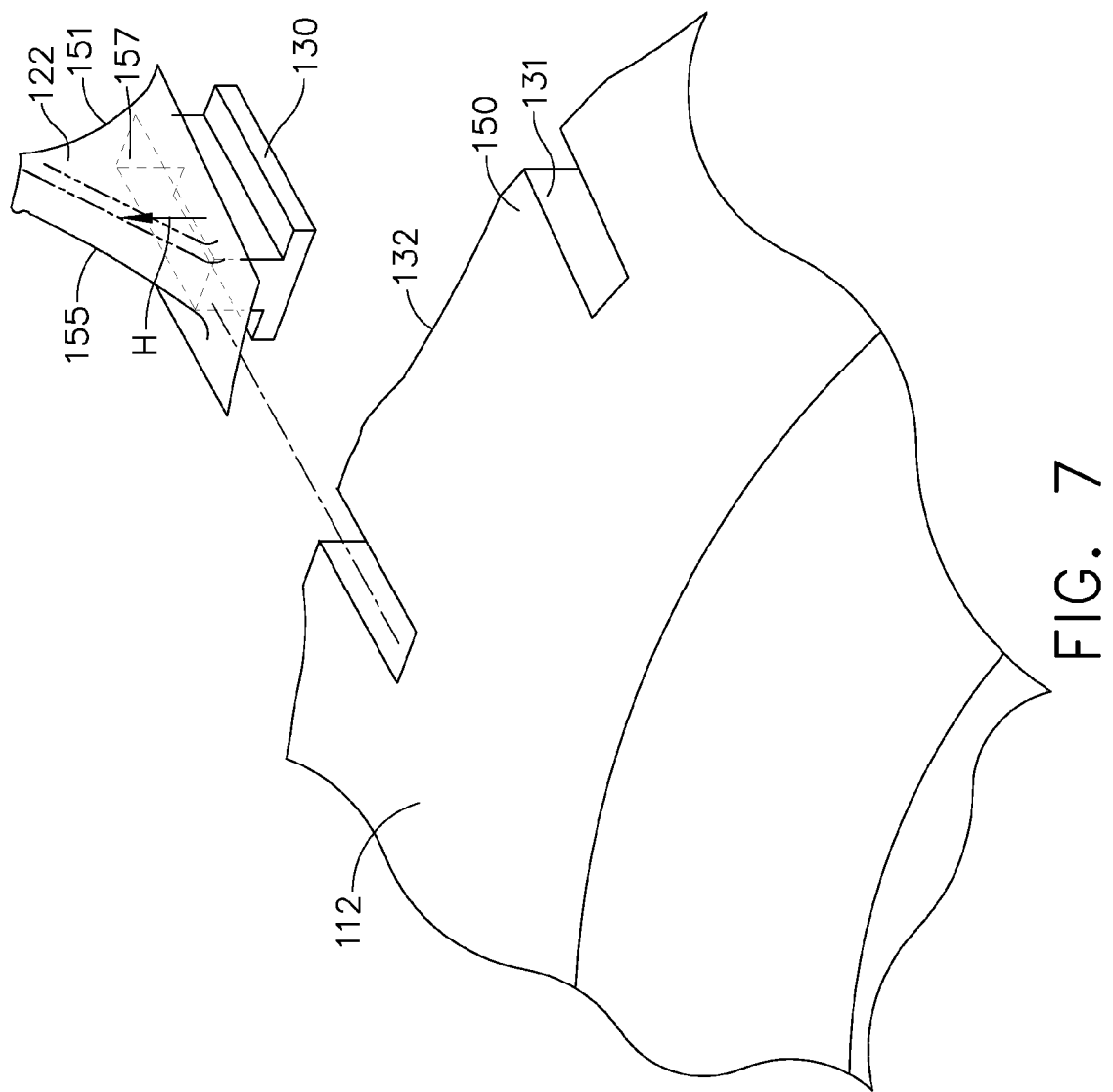

SPINNER ASSEMBLY WITH REMOVABLE FAN BLADE LEADING EDGE FAIRINGS

BACKGROUND OF THE INVENTION

1. Field of the Invention

The present invention relates generally to spinners and fans blades for gas turbine engine fan assemblies and, more specifically, to spinners with fairings or bumps directly upstream of fan blades.

2. Description of Related Art

Aircraft turbofan gas turbine engines include a fan assembly having a plurality of circumferentially spaced apart fan blades extending radially outwardly from a rotor disk. Ambient airflow is channeled between the blades and pressurized thereby for generating thrust for powering the aircraft in flight. The fan assembly typically includes a plurality of circumferentially spaced apart fan blades each having a dovetail root disposed in a complementary, axially extending dovetail groove or slot in a perimeter or rim of a rotor disk or drum. A spinner is mounted to a front end of the fan assembly to provide smooth airflow into the fan as illustrated in U.S. Pat. No. 6,416,280, by Forrester et al., entitled "One Piece Spinner", which issued Jul. 9, 2002, and which is incorporated herein by reference.

Some spinners are one piece spinners that attach directly to the disk post and some spinners are two piece spinners that have an upper portion of the spinner attached to a flange extending axially forwardly from a disk and a lower portion of the spinner attached to the upper portion of the spinner. This upper portion of the spinner is referred to as a spinner support.

A spinner support 1, similar to what is found in the prior art, is illustrated in FIGS. 1 and 2 and includes circumferentially spaced apart aerodynamic fairings 2 located along an aft portion 4 of the spinner support 1. The aerodynamic fairings 2 are designed to cover and shield radial portions of leading edges of each of fan blades in a fan of an engine (see FIGS. 3-5). Such fairings have also been referred to as bumps. These fairings have been used in aircraft gas turbine engines, for example in the GE-90 115B.

Adding this 3D feature, aerodynamic fairing 2 or bump to the conical surface 9 of the spinner support 1 (or to a one piece spinner) forward of the fan blade allows the fan blade profile to be streamlined and be made more aerodynamic without changing the blade shank. The fairing portion guides the airflow to either side of the blade lead edge profile at the blade root. The circumferentially spaced apart fairings or bumps are formed or machined on the spinner or spinner support 1.

In order to make engines more efficient, there are efforts to increase the fan blade radius ratio (RR) which is a ratio of inner fan flowpath diameter/outer flowpath diameter and which indicates how much airflow can be passed through the engine. A smaller radius ratio (RR) results in a larger flow area, and better performance. As the fan blade radius ratios decrease by lowering the fan platform flowpath surface, the fan blade leading edge profile begins to become larger and abrupt. RR may be decreased by increasing the outer fan diameter or making the inner flowpath and inner flowpath diameter smaller which is preferred. Increasing the overall fan diameter is less desirable because it increases drag.

Maximizing a low radius ratio design results in the blade LE profile being more exposed to the aerodynamic flow path. This LE needs to be protected resulting in a fairing shape that is larger in order to provide aerodynamic smoothness. This, in turn, results in a complex machined spinner or spinner support with large 3D aerodynamic fairings or bumps directly upstream of the fan blades.

It is highly desirable to avoid expensive and complex machining of the spinner or spinner support in order to provide larger 3D aerodynamic fairings or bumps directly upstream of the fan blades.

SUMMARY OF THE INVENTION

A gas turbine engine spinner assembly includes a spinner defining at least in part an aerodynamically smooth surface, a spinner shell defining at least in part the aerodynamically smooth surface, and circumferentially spaced apart removable aerodynamic fairings located around the shell.

An exemplary embodiment of the assembly includes fairing shanks attached to the aerodynamic fairings and disposed in circumferentially spaced apart axially extending slots in the shell. The fairing shanks are disposed between and monolithically formed with the aerodynamic fairings and fairing roots attached to the fairing shanks. The slots extend forwardly or upstream from an aft end or shell trailing edge of the shell. The fairing roots engage and trap the shell along radially outer and inner peripheral surface portions of the shell and the outer and inner peripheral surface portions extend circumferentially and axially forwardly or upstream around the slots. The fairing shanks are setback from fairing forward ends or fairing forward tips of the fairings and the fairing shanks are setback from root forward ends or root forward tips of the fairing roots.

The fairings may be made of an injectable thermoplastic and the shell made of metal.

A more particular exemplary embodiment of the spinner assembly includes a spinner attached to a spinner support, the shell being an annular support shell of the spinner support, the support defining at least in part the aerodynamically smooth surface, and the circumferentially spaced apart removable aerodynamic fairings being located around the support shell. The fairing shanks are attached to the aerodynamic fairings and the fairing shanks disposed in circumferentially spaced apart axially extending slots in the support shell.

The spinner assembly may be incorporated in fan assembly including a fan rotor disk or drum, a row of circumferentially spaced apart fan blades extending radially outwardly from the fan rotor disk or drum. Each blade includes a curved airfoil section having airfoil pressure and suction sides extending between axially spaced apart airfoil leading and trailing edges. The airfoil section is attached to a dovetail root by a blade shank.

The aerodynamic fairings may extend radially outwardly to cover and shield radially extending portions of the fan blades which may include at least portions of the blade shanks or portions of transition regions of the blade shanks.

BRIEF DESCRIPTION OF THE DRAWINGS

The foregoing aspects and other features of the invention are explained in the following description, taken in connection with the accompanying drawings where:

FIG. 1 is a perspective view illustration of a prior art spinner support of an aircraft gas turbine engine spinner with circumferentially spaced apart fairings.

FIG. 2 is an enlarged perspective view illustration of an aft end of the spinner support and the fairings illustrated in FIG. 1.

FIG. 7 is a cross-sectional illustration of the removable fairing through 7-7 in FIG. 6.

DETAILED DESCRIPTION OF THE INVENTION

Figure 3:
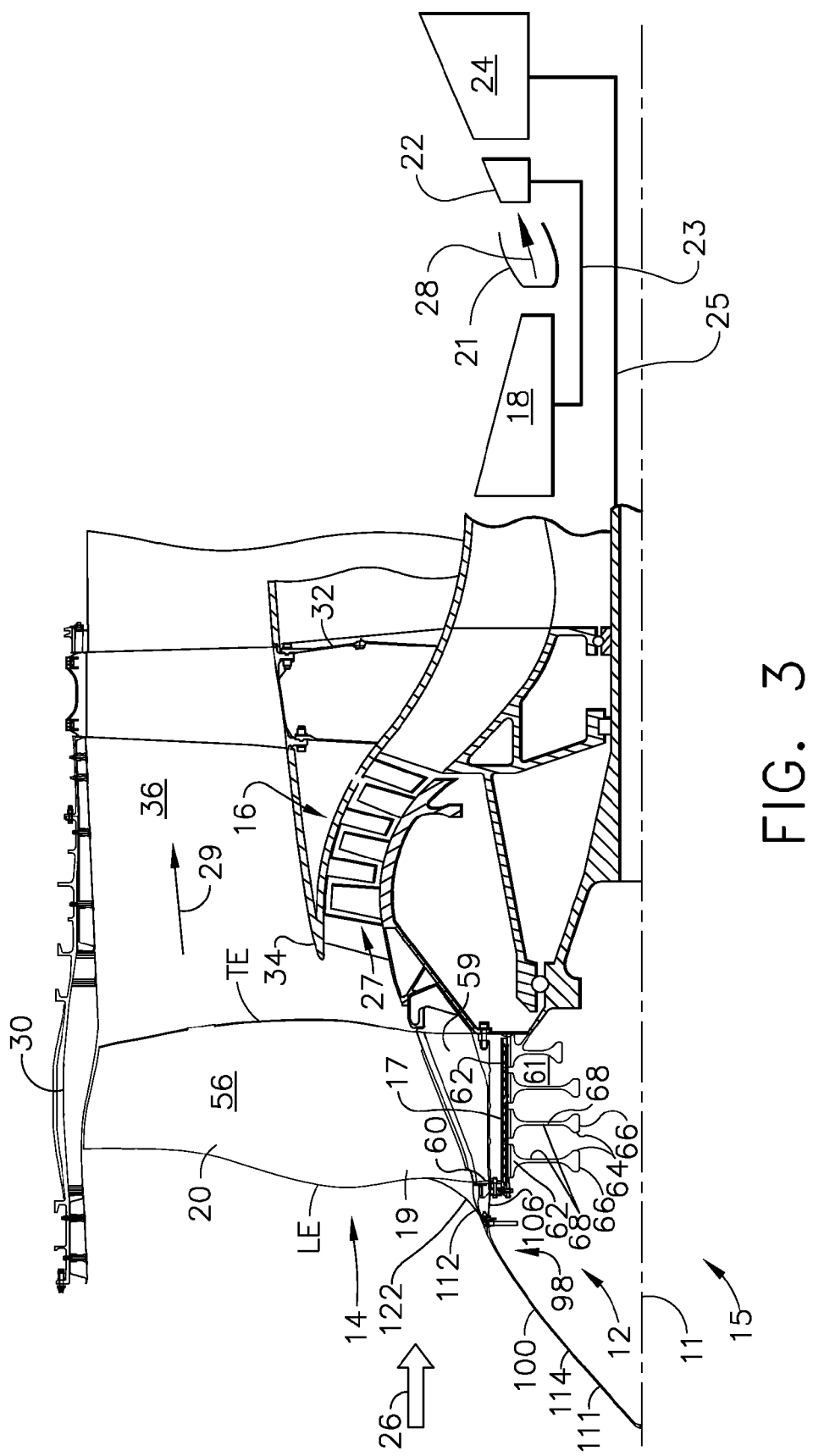
FIG. 3 is a longitudinal part sectional and part diagrammatical view illustration of an exemplary embodiment of an aircraft turbofan gas turbine engine having a spinner and a spinner support with circumferentially spaced apart removable fairings.
Figure 4:
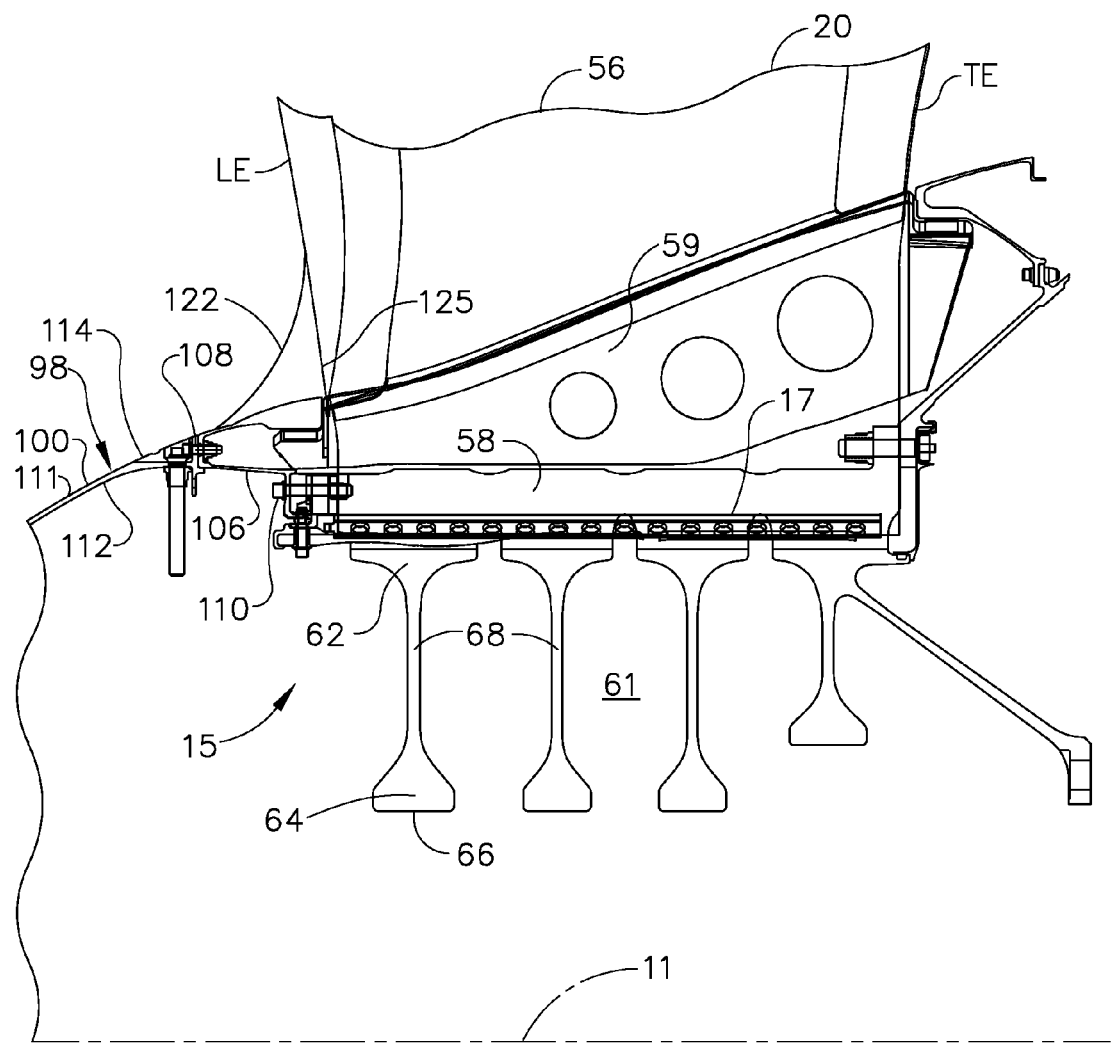
FIG. 4 is a perspective diagrammatical view illustration of the removable fairings shielding fan blade leading edges in the fan section illustrated in FIG. 3.

Illustrated in FIGS. 3 and 4 is an exemplary aircraft turbofan gas turbine engine 15 circumscribed about an engine centerline axis 11 and suitably designed to be mounted to a wing or fuselage of an aircraft. The engine 15 includes, in downstream serial flow communication, a fan 14, a booster or a low pressure compressor 16, a high pressure compressor 18, a combustor 21, a high pressure turbine (HPT) 22, and a low pressure turbine (LPT) 24. The HPT or high pressure turbine 22 is joined by a high pressure drive shaft 23 to the high pressure compressor 18. The LPT or low pressure turbine 24 is joined by a low pressure drive shaft 25 to both the fan 14 and booster or low pressure compressor 16.

In typical operation, air 26 is pressurized by the fan 14 and an inner portion of this air is channeled through the low pressure compressor 16 which further pressurizes the air. The pressurized air is then flowed to the high pressure compressor 18 which further pressurizes the air. The pressurized air is mixed with fuel in the combustor 21 for generating hot combustion gases 28 that flow downstream, in turn, through the HPT 22 and the LPT 24. Energy is extracted in the two turbines for powering the fan 14, low pressure compressor 16, and the high pressure compressor 18. A flow splitter 34 surrounding the booster compressor 16 immediately behind the fan 14 includes a sharp leading edge which splits the fan air 26 pressurized by the fan 14 into a radially inner stream 27 channeled through the booster compressor 16 and a radially outer stream 29 channeled through the bypass duct 36.

A fan nacelle 30 surrounding the fan 14 is supported by an annular fan frame 32. The low pressure compressor 16 is suitably joined to the fan 14 forward of the fan frame 32, is disposed radially inboard of the annular flow splitter 34, and is spaced radially inwardly from an inner surface of the fan nacelle 30 to partially define an annular fan bypass duct 36 therebetween. The fan frame 32 supports the nacelle 30. The fan 14 is part of a fan assembly 12.

Figure 5:
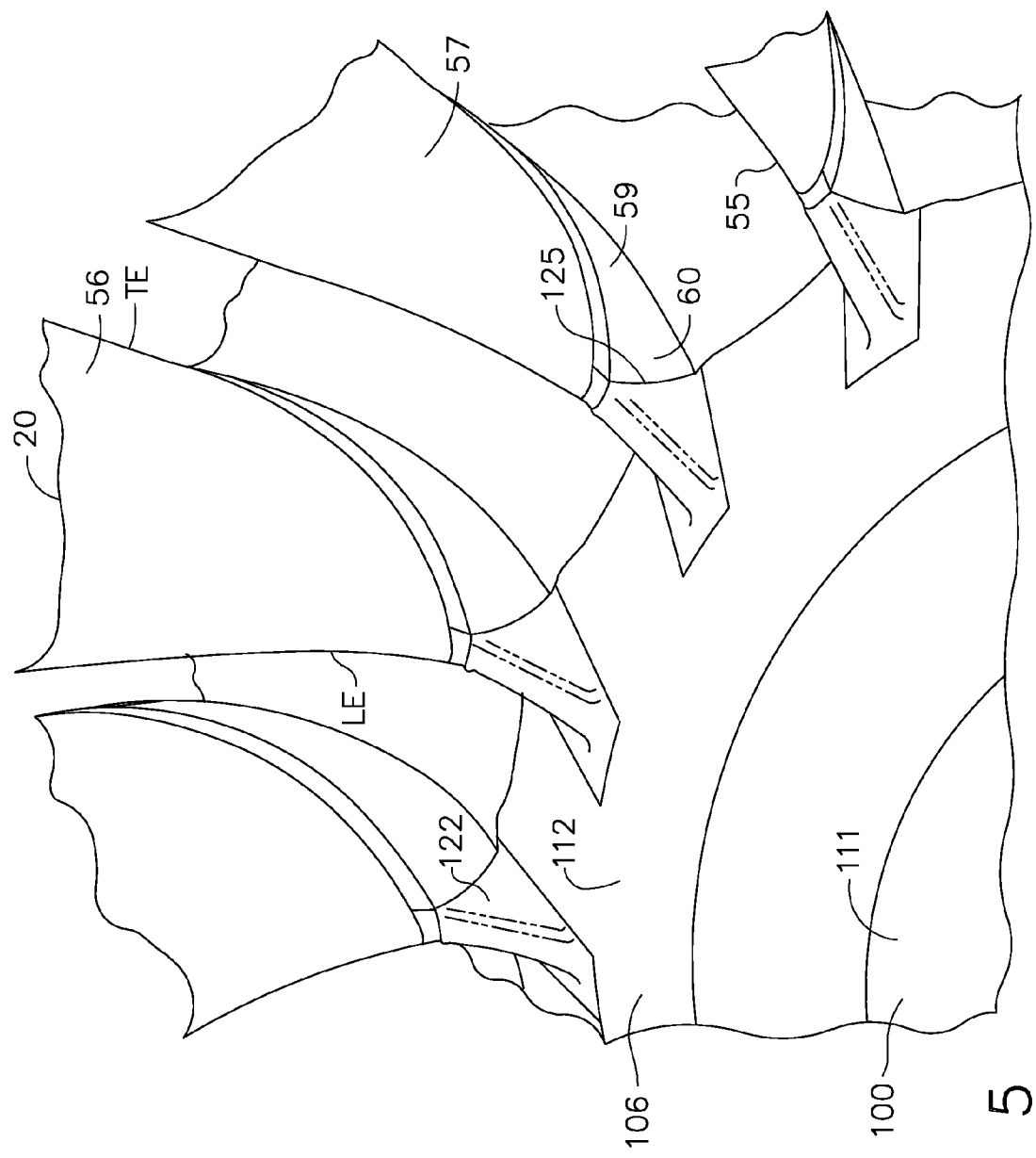
FIG. 5 is an enlarged cross-sectional view illustration of the spinner support with a removable fairing illustrated in FIG. 3.

Referring to FIG. 4, the fan assembly 12 includes a fan rotor disk 17 (or drum) from which extends radially outwardly a single axially located row 19 of circumferentially spaced apart fan blades 20. Each of the fan blades 20 has a curved airfoil section 56 with airfoil pressure and suction sides 55, 57, illustrated in FIG. 5, extending axially between axially spaced apart airfoil leading and trailing edges LE and TE, respectively. The airfoil section 56 is attached to a dovetail root 58 by a blade shank 59. The blade shank 59 includes a transition region 60 and extends between the airfoil section 56 and the dovetail root 58.

The fan rotor disk 17 is illustrated herein as a multi-bore disk having a rim 62 attached to a number of disk hubs 64 with bores 66 by a corresponding number of webs 68 circumscribed about the centerline axis 11. Web channels 61 extend axially between the webs 68 and radially between the rim 62 and the hubs 64. A spinner assembly 98 is attached to the disk 17. The exemplary embodiment of the spinner assembly 98 illustrated herein includes a spinner 100 attached to the disk 17.

The exemplary embodiment of the spinner assembly 98 illustrated herein includes the spinner 100 attached to a spinner support 106 with first bolts 108. The spinner support 106 is attached to the disk 17 with second bolts 110. The spinner 100, as illustrated in the exemplary embodiment herein, is annular and has a substantially conical shape. The spinner 100 includes an annular spinner shell 111. The spinner support 106, further illustrated in FIGS. 5 and 6, includes an annular support shell 112, which together with the spinner 100 and the spinner shell 111, provides the spinner assembly with an aerodynamically smooth surface 114 over which fan air 26 flows into the fan blades 20. Circumferentially spaced apart removable aerodynamic fairings 122 are located around the support shell 112 or the spinner shell 111 if the spinner assembly 98 does not include a spinner support 106.

Referring to FIGS. 4-7, the circumferentially spaced apart aerodynamic removable fairings 122 are located along an aft portion 124 of the spinner support 106. The aerodynamic fairings 122 are to cover and shield radially extending portions 125 of the blade shanks 59. In a more particular embodiment of the aerodynamic fairings 122, the radially extending portions 125 of the blade shanks 59 include the transition regions 60 of the blade shanks 59. The fairings may also been referred to as bumps. The aerodynamic fairings 122 are attached to fairing shanks 128 which are, in turn, attached to fairing roots 130. The fairing shanks 128 are disposed between and preferably integral and monolithically formed with the aerodynamic fairings 122 and the fairing roots 130.

Figure 6:
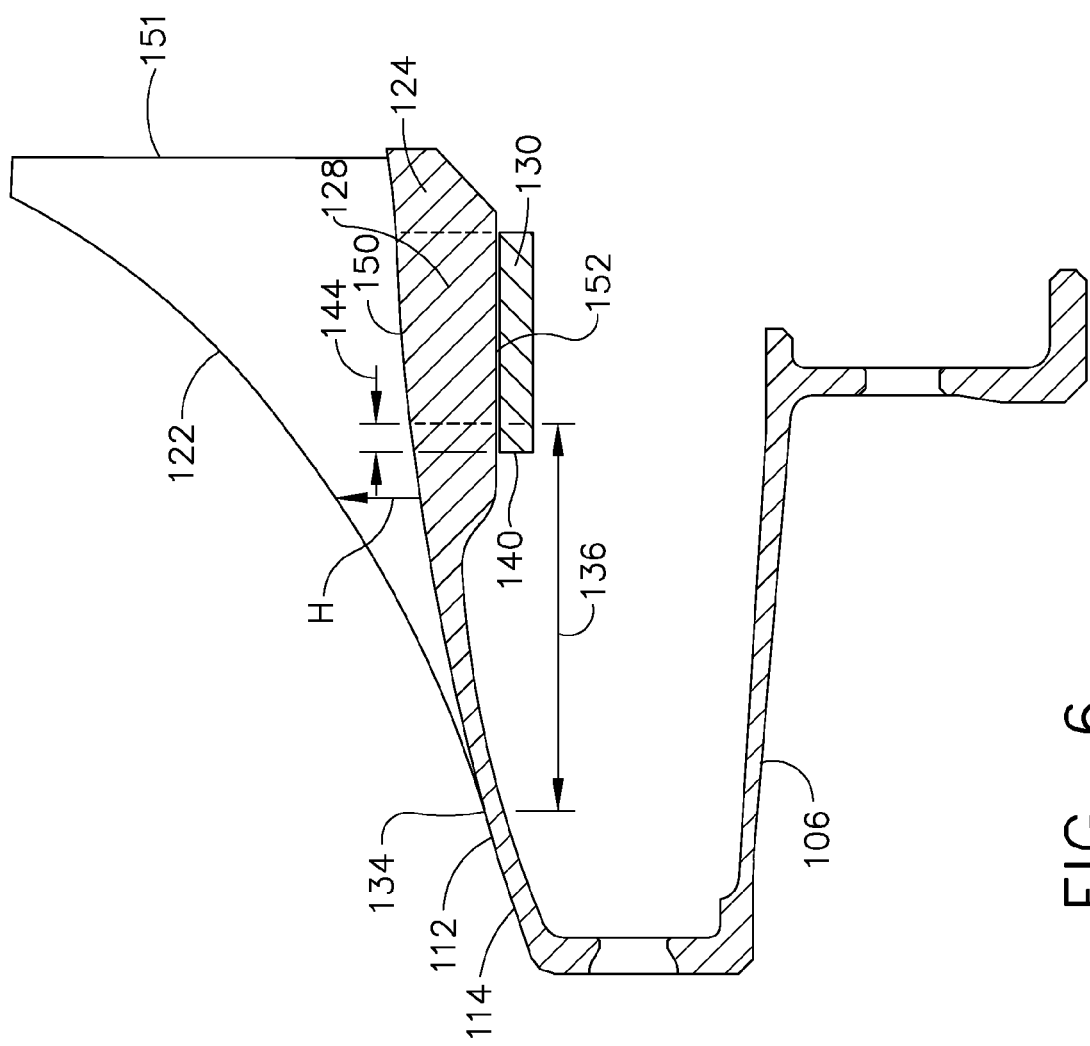
FIG. 6 is an exploded perspective diagrammatical view illustration of the spinner support and the removable fairing illustrated in FIG. 5.

Referring to FIGS. 6 and 7, circumferentially spaced apart axially extending slots 131 in the support shell 112 of the spinner support 106 extend forwardly or upstream from an aft end or shell trailing edge 132 of the support shell 112. The fairing shanks 128 of removable fairings 122 are disposed in the slots 131. The fairing shanks 128 are setback from a fairing forward end or fairing forward tip 134 of the fairings 122 by a fairing setback 136. The fairing shanks 128 are also setback from a root forward end or a root forward tip 140 of the fairing root 130 by a root setback 144. Thus, when the removable fairings 122 are mounted to the spinner support 106, the fairings 122 and the fairing root 130 engage and trap the annular support shell 112 along radially outer and inner peripheral surface portions 150, 152 of the annular support shell 112 extending circumferentially and axially forward or upstream around the slots 131.

The fairings 122 may be removably attached by means other than the fairing shanks in the slot in the shell. For example the fairings 122 may be removably attached to the shell by bolts or screws.

The fairings 122 preferably fit flush against and engage, but are not bonded, to the outer peripheral surface portions 150 of the annular support shell 112. Note, that the outer peripheral surface portions 150 of the annular support shell 112 is part of the aerodynamically smooth surface 114 over which fan air 26 flows into the fan blades 20. Optionally, the fairings 122 may be bonded to the outer peripheral surface portions 150 of the annular support shell 112. The exemplary embodiment of the fairings 122 illustrated herein includes a triangular cross section and increases in radial height H from the fairing forward tip 134 aftwardly or downstream to a fairing aft end 151. The fairings 122 include fairing pressure and suction sides 155, 157, which may be concavely and convexly curved consistent with the concavely and convexly curved airfoil pressure and suction sides 55, 57, respectively, of the curved airfoil sections 56 of the fan blades 20.

An alternative embodiment of the spinner assembly includes the spinner directly attached to the disk and the circumferentially spaced apart axially extending slots are disposed in the spinner and extend forwardly or upstream from an aft end of the spinner. The removable fairings are mounted to the spinner by the fairing shanks disposed in the slots. The fairing shanks 128 are setback from a fairing forward end or fairing forward tip of the fairings by a fairing setback. The fairings and the fairing roots engage and trap the spinner along radially outer and inner peripheral surface portions of the spinner extending circumferentially and axially forward or upstream around the slots.

The circumferentially spaced apart aerodynamic removable fairings forward of the fan blades allows the blade profile to be streamlined and made more aerodynamic without changing the transition region of the fan blade shank. The fairing guides the airflow to either side of the blade leading edge profile at the blade root. The removable fairings can be easily matched to different blade contours should blade design change late in the design and development program. The removable fairings or aerodynamic bumps on the spinner or spinner support can be made from a different material than the spinner or spinner support. The removable fairings allow an increased height of the fairings without added cost of machining them into the spinner or spinner support.

The reduced machining may yield a lower scrap rate. The removable fairings allow the use of more complicated aerodynamic shapes having improved performance. It is more difficult to machine these aerodynamically improved and larger fairings in the spinners and spinner supports. They may be heavier if machined than if separable and made of lighter material. Typically, the spinners and spinner supports and machined in fairings or bumps are made of solid metal. The removable fairings may be made of an injectable thermoplastic which can save weight and be a replaceable piece if excessive erosion is seen in the field. The removable fairings may be replaced in the field, particularly, if excessive erosion is seen in the field.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims:

1. A gas turbine engine spinner assembly comprising:
   a spinner,
   the spinner defining at least in part an aerodynamically smooth surface,
   a spinner shell defining at least in part the aerodynamically smooth surface, and
   circumferentially spaced apart removable aerodynamic fairings located around the shell;
   further comprising fairing shanks attached to the aerodynamic fairings and the fairing shanks disposed in circumferentially spaced apart axially extending slots in the shell.

2. The spinner assembly as claimed in claim 1 further comprising the fairing shanks disposed between and monolithically formed with the aerodynamic fairings and fairing roots attached to the fairing shanks.

3. The spinner assembly as claimed in claim 2 further comprising the slots extending forwardly or upstream from an aft end or shell trailing edge of the shell.

4. The spinner assembly as claimed in claim 3 further comprising the fairing roots engaging and trapping the shell along radially outer and inner peripheral surface portions of the shell and the outer and inner peripheral surface portions extending circumferentially and axially forwardly or upstream around the slots.

5. The spinner assembly as claimed in claim 4 further comprising the fairing shanks setback from fairing forward ends or fairing forward tips of the fairings.

6. The spinner assembly as claimed in claim 5 further comprising the fairing shanks setback from root forward ends or root forward tips of the fairing roots.

7. The spinner assembly as claimed in claim 2 further comprising the fairings made of an injectable thermoplastic and the shell made of metal.

8. A gas turbine engine spinner assembly comprising:
   a spinner,
   the spinner defining at least in part an aerodynamically smooth surface,
   a spinner shell defining at least in part the aerodynamically smooth surface, and
   circumferentially spaced apart removable aerodynamic fairings located around the shell;
   further comprising:
   the spinner attached to a spinner support,
   the shell being an annular support shell of the spinner support,
   the support defining at least in part the aerodynamically smooth surface, and
   the circumferentially spaced apart removable aerodynamic fairings being located around the support shell;
   further comprising fairing shanks attached to the aerodynamic fairings and the fairing shanks disposed in circumferentially spaced apart axially extending slots in the support shell.

9. The spinner assembly as claimed in claim 8 further comprising the fairing shanks disposed between and monolithically formed with the aerodynamic fairings and fairing roots attached to the fairing shanks.

10. The spinner assembly as claimed in claim 9 further comprising the slots extending forwardly or upstream from an aft end or shell trailing edge of the support shell.

11. The spinner assembly as claimed in claim 10 further comprising:
   the fairing roots engaging and trapping the support shell along radially outer and inner peripheral surface portions of the support shell,
   the outer and inner peripheral surface portions extending circumferentially and axially forwardly or upstream around the slots, and
   the fairing shanks setback from a fairing forward end or fairing forward tip of the fairings.

12. The spinner assembly as claimed in claim 9 further comprising the fairings made of an injectable thermoplastic and the shell made of metal.

13. A fan assembly comprising:
   a fan rotor disk or drum,
   a row of circumferentially spaced apart fan blades extending radially outwardly from the fan rotor disk or drum,
   each of the fan blades including a curved airfoil section having airfoil pressure and suction sides extending between axially spaced apart airfoil leading and trailing edges, the airfoil section being attached to a dovetail root by a blade shank,
a gas turbine engine spinner assembly including a spinner,
the spinner defining at least in part an aerodynamically smooth surface,
a shell defining at least in part the aerodynamically smooth surface, and
circumferentially spaced apart removable aerodynamic fairings located around the shell.

14. The fan assembly as claimed in claim 13 further comprising fairing shanks attached to the aerodynamic fairings and the fairing shanks disposed in circumferentially spaced apart axially extending slots in the shell.

15. The fan assembly as claimed in claim 14 further comprising the aerodynamic fairings extending radially outwardly to cover and shield radially extending portions of the fan blades.

16. The fan assembly as claimed in claim 15 further comprising the radially extending portions include at least portions of the blade shanks.

17. The fan assembly as claimed in claim 16 further comprising the radially extending portions at least portions of transition region of the blade shanks.

18. The fan assembly as claimed in claim 15 further comprising the fairing shanks disposed between and monolithically formed with the aerodynamic fairings and fairing roots attached to the fairing shanks.

19. The fan assembly as claimed in claim 18 further comprising the slots extending forwardly or upstream from an aft end or shell trailing edge of the shell.

20. The fan assembly as claimed in claim 19 further comprising the fairing roots engaging and trapping the shell along radially outer and inner peripheral surface portions of the shell and the outer and inner peripheral surface portions extending circumferentially and axially forwardly or upstream around the slots.

21. The fan assembly as claimed in claim 20 further comprising the fairing shanks setback from fairing forward ends or fairing forward tips of the fairings.

22. The fan assembly as claimed in claim 21 further comprising the fairing shanks setback from root forward ends or a root forward tips of the fairing roots.

23. The fan assembly as claimed in claim 18 further comprising the fairings made of an injectable thermoplastic and the shell made of metal.

24. The fan assembly as claimed in claim 13 further comprising:
the spinner attached to a spinner support,
the shell being an annular support shell of the spinner,
the shell being an annular support shell of the spinner support,
the support defining at least in part the aerodynamically smooth surface, and
the circumferentially spaced apart removable aerodynamic fairings being located around the support shell.

25. The fan assembly as claimed in claim 24 further comprising fairing shanks attached to the aerodynamic fairings and the fairing shanks disposed in circumferentially spaced apart axially extending slots in the support shell.

26. The fan assembly as claimed in claim 25 further comprising the fairing shanks disposed between and monolithically formed with the aerodynamic fairings and fairing roots attached to the fairing shanks.

27. The fan assembly as claimed in claim 26 further comprising the slots extending forwardly or upstream from an aft end or shell trailing edge of the support shell.

28. The fan assembly as claimed in claim 27 further comprising:
the fairing roots engaging and trapping the support shell along radially outer and inner peripheral surface portions of the support shell,
the outer and inner peripheral surface portions extending circumferentially and axially forwardly or upstream around the slots, and
the fairing shanks setback from a fairing forward end or fairing forward tip of the fairings.

29. The fan assembly as claimed in claim 26 further comprising the fairings made of an injectable thermoplastic and the support shell made of metal.

* * * * *